(12) United States Patent
Niwa et al.

(10) Patent No.: US 7,134,272 B2
(45) Date of Patent: Nov. 14, 2006

(54) EXHAUST GAS PURIFYING CATALYST

(75) Inventors: Yusuke Niwa, Tokyo (JP); Junji Ito, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/367,954

(22) Filed: Feb. 19, 2003

(65) Prior Publication Data
US 2003/0167752 A1  Sep. 11, 2003

(30) Foreign Application Priority Data

Feb. 19, 2002 (JP) ............... 2002-040950
Feb. 5, 2003 (JP) ............... 2003-027970

(51) Int. Cl.
*F01N 3/00* (2006.01)

(52) U.S. Cl. ............... 60/285; 60/274; 60/295; 60/301; 60/303

(58) Field of Classification Search ........... 60/274, 60/275, 285, 286, 295, 297, 301, 303
See application file for complete search history.

(56) References Cited

U.S. PATENT DOCUMENTS

| | | | |
|---|---|---|---|
| 5,412,946 A | 5/1995 | Oshima et al. | |
| 5,599,758 A | 2/1997 | Guth et al. | |
| 6,244,044 B1 * | 6/2001 | Bartley | 60/274 |
| 6,508,057 B1 * | 1/2003 | Bouchez et al. | 60/286 |
| 6,557,342 B1 * | 5/2003 | Suga et al. | 60/301 |
| 6,560,958 B1 * | 5/2003 | Bromberg et al. | 60/275 |
| 6,651,424 B1 * | 11/2003 | Twigg | 60/289 |
| 2001/0004832 A1 * | 6/2001 | Hanaki et al. | 60/286 |

FOREIGN PATENT DOCUMENTS

| | | |
|---|---|---|
| EP | 1 094 206 A2 | 4/2001 |
| EP | 1 108 863 A2 | 6/2001 |
| JP | 2001-234737 A | 8/2001 |
| WO | WO 00/53903 * | 9/2000 |
| WO | WO 01/37978 A1 | 5/2001 |

* cited by examiner

Primary Examiner—Tu M. Nguyen
(74) Attorney, Agent, or Firm—Foley & Lardner LLP (57) ABSTRACT

An exhaust gas purifying system includes, an internal combustion engine, an exhaust passage of exhaust gas from the internal combustion engine, a hydrogen-catalyst provided in the exhaust passage, an NOx purifying catalyst provided on a downstream of the hydrogen-catalyst of the exhaust passage to reduce nitrogen oxides, and a control unit. The hydrogen-catalyst has a function of transmitting or generating hydrogen. In the purifying system, the control unit executes enrichment condition control for reducing an air/fuel ratio (A/F)r during enrichment to prolong a time of enrichment (tr) as a flow rate of exhaust gas emitted from the internal combustion engine is lowered in intermittent enrichment of the air/fuel ratio.

17 Claims, 6 Drawing Sheets

EXHAUST GAS PURIFYING CATALYST

BACKGROUND OF THE INVENTION

1. Field of the Invention

The present invention relates to an air/fuel ratio control technology for purifying exhaust gas emitted from an internal combustion engine, a combustor or the like, and more particularly to an exhaust gas purifying system capable of efficiently purifying nitrogen oxides in the exhaust gas by effective use of hydrogen.

2. Description of the Related Art

In order to improve fuel consumption of the internal combustion engine, an air/fuel ratio of a mixture supplied to the internal combustion engine is controlled to an air/fuel ratio of a lean side, in which A/F is about 22 (A: air mass, F: fuel mass), that is a fuel ratio is smaller than a stoichiometric air/fuel ratio of A/F=14.7. However, a three-way catalyst used for purifying NOx in the exhaust gas has highest purification efficiency in the stoichiometric air/fuel ratio. Accordingly, since the air/fuel ratio control to the lean side reduces the NOx purification efficiency of the three-way catalyst, a great volume of nitrogen oxides, i.e., NOx, is discharged into the atmosphere.

Therefore, for the internal combustion engine capable of executing lean-burning, purifying the nitrogen oxides by an NO trap-catalyst containing an NOx adsorbent for trapping the nitrogen oxides is employed. This NOx adsorbent traps NOx at the time of a lean air/fuel ratio, and reduces the trapped NOx by a reducer (HC, CO, or H) at the time of a rich air/fuel ratio to discharge and purify the NOx. The reducers not used for the discharging and purifying of the NOx are removed by oxidation.

However, in the case of the NOx adsorbent contained in the NOx trap-catalyst, because of a limitation on the volume of nitrogen oxides to be trapped, lean-burning cannot be continued for a long time. Thus, in order to discharge and purify the trapped nitrogen oxides, control must be executed to temporarily enrich an air/fuel ratio. Incidentally, control conditions for enrichment, i.e., control conditions of a value of an A/F ratio and a maintenance time of a rich state, vary depending on a gas flow rate or a gas flow velocity. The gas flow rate is represented by a space velocity (SV) or exhaust gas passed through the catalyst. The space velocity is a value obtained by dividing a gas flow rate (1/min) by a catalyst volume (1). Hereinafter, in the specification, the gas flow rate means a gas space velocity (SV) unless specified otherwise.

As an increase of a gas flow rate brings about an increase of a load on the internal combustion engine, an exhaust gas temperature is raised to increase a temperature of the NOx trap-catalyst. Following this temperature increase, the amount of NOx discharged from the NOx trap-catalyst is also increased. On the other hand, the increased gas flow rate reduces a contact time between the exhaust gas and the catalyst to lower reaction efficiency and, consequently, NOx purification efficiency is also reduced. Thus, control is executed to reduce an air/fuel ratio (A/F)r more at the time of enrichment or to prolong the time of enrichment (tr) as the gas flow rate or the gas flow velocity is increased.

The above NOx purifying method is very effective in a relatively high temperature region of 300° C. or higher. However, the NOx purification efficiency is considerably reduced in a temperature region lower than this region. This is attributed to the discharging difficulty of the trapped nitrogen oxides from the NOx adsorbent in the low temperature region. Investigation by the inventors et al. reveals that carbon monoxide (CO) and hydrocarbon (HC), especially CO, suppresses the discharging of the nitrogen oxides. However, it has been found that use of only hydrogen as a reducer greatly promotes the discharging of the nitrogen oxides to dramatically improve NOx purification performance. Based on such a knowledge, Japanese Patent Application Laid-Open No. 2001-234737 discloses a system combining a hydrogen-catalyst which is a hydrogen enriching means, and an NOx purification catalyst, in which among reducers, i.e., CO, HC and hydrogen ($H_2$), generated in enrichment, the CO and the HC are selectively reduced, and the hydrogen is increased to be supplied.

SUMMARY OF THE INVENTION

In the system disclosed in the aforementioned publication, the CO and the HC are greatly reduced to increase hydrogen concentration by the hydrogen-catalyst installed on the upstream side of the NOx purification catalyst, whereby NOx purification performance can be dramatically improved even in a low temperature region. However, when a gas flow rate (flow velocity) is lowered, a residence time of exhaust gas is increased, and not only the CO and the HC but also the hydrogen is reduced by the hydrogen-catalyst. As a result, almost no hydrogen is supplied to the NOx purification catalyst, creating a phenomenon of lowered NOx purification efficiency.

That is, if an air/fuel ratio (A/F)r at the time of enrichment and a time of enrichment (tr) are fixed for discharging/purifying trapped NOx, the amount of CO and hydrogen to be generated is reduced as the gas flow rate is lowered more. On the other hand, since a volume of the hydrogen-catalyst is not changed, reactivity between the CO or the hydrogen generated by the enrichment and the hydrogen-catalyst is increased, as the gas flow rate (gas flow velocity) is lowered. As a result, not only the CO but also the hydrogen is reduced, thus the NOx purification efficiency in the low temperature region is lowered.

The present invention is designed to solve the foregoing problems in the exhaust gas purifying system. An object of the invention is to provide an exhaust gas purifying system capable of constantly supplying, even if fluctuation occurs in an exhaust gas flow rate or flow velocity, the amount of hydrogen necessary for NOx purification from a hydrogen-catalyst of an upstream side of an exhaust passage to an NOx purification catalyst of a downstream side without being influenced by the fluctuation, and capable of efficiently purifying nitrogen oxides even in a low temperature region.

According to a first embodiment, an exhaust gas purifying system, includes an internal combustion engine, an exhaust passage of exhaust gas from the internal combustion engine, a hydrogen-catalyst provided in the exhaust passage an NOx purifying catalyst provided on a downstream of the hydrogen-catalyst of the exhaust passage to reduce nitrogen oxides, and a control unit. The hydrogen-catalyst makes at least one of the following reactions (a) to (c), (a) reaction for selectively removing CO by oxidation, and suppressing consumption of hydrogen, (b) reaction for adsorbing CO, and transmitting hydrogen, and (c) reaction for rending CO with $H_2O$ to generate hydrogen.

The control unit controlling an air/fuel ratio of mixed gas of fuel and air supplied to the internal combustion engine, which executes enrichment condition control for reducing an air/fuel ratio (A/F)r during enrichment to prolong a time of enrichment (tr) as a flow rate of exhaust gas emitted from the internal combustion engine is lowered in intermittent enrichment of the air/fuel ratio.

According to a second embodiment of this invention, an exhaust gas purifying system includes an internal combustion engine, an exhaust passage of exhaust gas from the internal combustion engine, a hydrogen-catalyst provided in the exhaust passage, an NOx purifying catalyst provided on a downstream of the hydrogen-catalyst of the exhaust passage, and a control unit which controls an air/fuel ratio of mixed gas of fuel and air supplied to the internal combustion engine. The hydrogen-catalyst contains ceria and precious metal of at least one or more selected from the group consisting of Pr, Pd and Rh. The NOx purifying catalyst contains alkaline metal or alkaline earth metal, and precious metal of at least one or more selected from the group consisting of Pr, Pd and Rh. The control unit reduces an air/fuel ratio (A/F)r during enrichment to prolong a time of enrichment (tr) as a flow rate of exhaust gas emitted from the internal combustion engine is lowered.

According to a third embodiment of this invention, a controlling method for an exhaust gas purifying system having an internal combustion engine, an exhaust passage of exhaust gas from the internal combustion engine, a hydrogen-catalyst provided in the exhaust passage, the hydrogen-catalyst containing at least $CeO_2$ and precious metal, and an NOx purifying catalyst provided on a downstream of the hydrogen-catalyst of the exhaust passage to reduce nitrogen oxides. The controlling method, includes (a) detecting the amount of air sucked into the internal combustion engine;

(b) detecting a temperature of exhaust gas flowing into the hydrogen-catalyst;

(c) reading prestored first to fourth data maps, the first data map indicating a relation between the amount of sucked air and the amount of adsorbed CO in the hydrogen-catalyst, the second data map indicating a relation between the exhaust gas temperature and the amount of adsorbed CO in the hydrogen-catalyst, the third data map indicating a relation between the amount of sucked air and the amount of reacted CO in the hydrogen-catalyst, and the fourth data map indicating a relation between the exhaust gas temperature and the amount of reacted CO in the hydrogen-catalyst;

(d) reading the amount of adsorbed CO and the amount of reacted CO in the hydrogen-catalyst based on the detected amount of sucked air and the detected exhaust gas temperature by referring to the first to fourth data maps, and predicting the amount of CO consumption in the hydrogen-catalyst from the amount of adsorbed CO and the amount of reacted CO;

(e) reading prestored fifth and sixth data maps, the fifth data map indicating a relation between the amount of CO consumption and an optimal amount of fuel injection with respect to the amount of CO consumption, and the sixth data map indicating the amount of CO consumption and an optimal time of fuel injection with respect to the amount of CO consumption; and (f) deciding the optimal amount of fuel injection and an optimal time of fuel injection condition based on the predicted amount of CO consumption by referring to the fifth and sixth data maps.

DESCRIPTION OF THE PREFERRED EMBODIMENTS

Next, detailed description will be made of the preferred embodiments of the exhaust gas purifying system of the present invention. In the specification, "%" represents a mass percentage unless specified otherwise.

Figure 1:
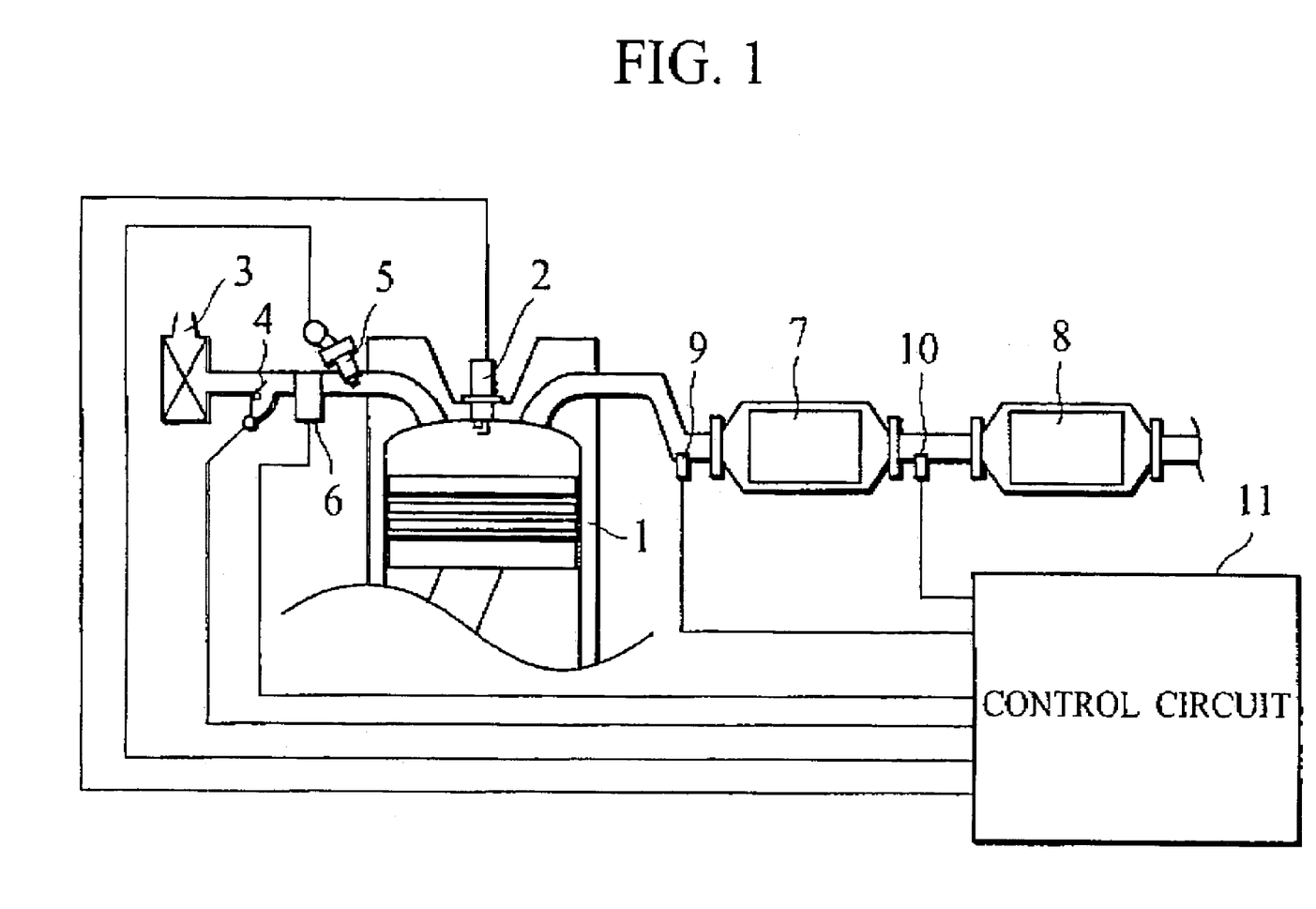
FIG. 1 is a constitutional view showing an example of an exhaust gas purifying system according to an embodiment of the present invention.

FIG. 1 is a constitutional view showing an example of an exhaust gas purifying system according to an embodiment of the present invention. An internal combustion engine 1 has an intake air path and an exhaust gas passage. Air is sucked from an air cleaner 3 through a throttle valve 4 into the intake air path. An air flowmeter 6 is disposed on the downstream side of the throttle valve 4 to measure the amount of air sucked into the internal combustion engine 1. A hydrogen-catalyst 7 is disposed on the upstream side of the exhaust gas passage of the internal combustion engine 1, and an NOx trap-catalyst 8 is arranged as an NOx purifying catalyst on the downstream side thereof. Additionally, a catalyst temperature sensor 9 is installed before the hydrogen-catalyst 7, and an A/F sensor 10 is installed before the NOx trap-catalyst 8.

In FIG. 1, a signal detected by the air flowmeter 6, the catalyst temperature sensor 9, the A/F sensor 10 or the like is sent to a control circuit (catalyst control unit) 11. After its analysis in the control circuit 11, the signal is converted into a signal for adjusting an exhaust gas air/fuel ratio, and outputted from the control circuit 11. The outputted signal is sent to a driving circuit provided in each of a spark plug 2, the throttle valve 4 and 4 fuel injection valve 5 to drive the same.

The amount of air sucked from the air cleaner 3 is adjusted by the throttle valve 4, and introduced into a combustion chamber of the internal combustion engine 1. Furthermore, fuel is injected from the fuel injection valve 5 to the air introduced into the combustion chamber of the internal combustion engine 1 to generate a mixture. The mixture is ignited by the spark plug 2, thus burning with a desired air/fuel ratio. Then exhaust gas with the air/fuel ratio is generated and emitted into the exhaust gas passage having the hydrogen-catalyst 7 and the NOx trap-catalyst 8 disposed therein.

In the exhaust gas purifying system according to the present embodiment, for the purpose of purifying and discharging NOx trapped in the NOx trap-catalyst 8 or the like, an air/fuel ratio is intermittently controlled to a rich side by the control unit 11. Especially under a low temperature condition of an exhaust gas temperature of 300° C. or lower, in order to enhance a function of the hydrogen-catalyst 7, control is executed, in accordance with a reduction of an exhaust gas flow rate, to lower an air/fuel ratio (A/F)r and prolong a time of enrichment (tr) during enrichment as the exhaust gas flow rate is reduced. When the exhaust gas flow rate (SV) is reduced, a ratio of a fuel gas decomposition component in the exhaust gas is increased. Accordingly, the amounts of hydrogen and CO contained in the exhaust gas are increased and, in the hydrogen-catalyst 7, oxidation reaction of the CO is preferentially executed to reduce only the CO while the hydrogen reaches the NOx purifying catalyst of the downstream side without bring oxidized. Therefore, even it fluctuation occurs in the exhaust gas flow rate or flow velocity, the amount of hydrogen necessary for NOx purification is constantly supplied without being influenced by the fluctuation to efficiently purify the nitrogen oxides.

Now, each catalyst used in the exhaust gas purifying systems of the embodiment will be described more in detail.

The hydrogen-catalyst 7 has a function of increasing hydrogen concentration in all reducer components by selectively reducing CO in the enriched exhaust gas, and generating or transmitting hydrogen. In the hydrogen-catalyst 7, the following reactions mainly occur:

(a) reaction for selectively removing CO by oxidation, suppressing consumption of hydrogen and transmitting hydrogen;

(b) reaction for adsorbing CO and transmitting hydrogen; and (c) reaction for reacting CO with $H_2O$ to generate hydrogen.

Initially, the CO in the exhaust gas is adsorbed by the hydrogen-catalyst, the reaction (b) mainly progresses, and then the reaction (a) progresses. Furthermore, the reaction (c) progresses, where the CO is reacted with $H_2O$ in the exhaust gas to generate hydrogen. These reactions are repeated. Accordingly, as the time passes, a plurality of reactions different in places in the hydrogen-catalyst simultaneously progress.

As a composition of the hydrogen-catalyst 7, a material having storage oxygen such as $CeO_2$ or a $CeO_2$ composite oxide (oxygen storage agent), a material having a CO adsorption ability, or a material containing an optional mixture of these materials and, Pt, Pd or Rh, or an optional mixture of these are used. Incidentally, as the material having a CO adsorbing ability, a material such as $CeO_2$ having an oxygen storage function, copper or the like can be cited.

Therefore, the hydrogen-catalyst only needs to contain storage oxygen such as $CeO_2$ or a $CeO_2$ composite oxide and, Pt, Pd or Rh, or a mixture of these. Further, if alumina is added as an additive, the function of transmitting and generating hydrogen can be improved more. Precedence of the reactions (a) to (c) depends on the amount of storage oxygen or the amount of adsorbed CO in the catalyst.

As described above, the hydrogen-catalyst contains the three-way catalyst component, but the CO can be greatly reduced even if the air/fuel ratio is at a rich side. On the other hand, in the conventional three-way catalyst, CO purification efficiency is considerably reduced at the rich side. In this respect, the hydrogen-catalyst is greatly different in functions from the three-way catalyst. Additional characteristic of the catalyst material is that the amount of storage oxygen and the $CeO_2$ content of the hydrogen-catalyst are considerably greater compared with the three-way catalyst.

The NOx trap-catalyst 8 which is an example of an NOx purifying catalyst has a characteristic that NOx is trapped by the contained NOx adsorbent at the lean side of the air/fuel ratio, and the trapped NOx is discharged/purified by a reducer (HC, CO or hydrogen) at the rich side. The reducers (HC, CO or hydrogen) not used for the discharging/purifying of NOx are removed by oxidation.

As such an NOx trap-catalyst, the NOx adsorbent, its carrier, i.e., oxide ceramics, or a material containing a three-way catalyst component can be used. For the NOx adsorbent, alkaline metal, alkaline earth metal and a mixture thereof can be used. Alumina can be used for the carrier. Pt, Pd or Rh and a mixture thereof can be used for the three-way catalyst.

Incidentally, any catalysts disposed on the downstream side of the hydrogen-catalyst 7 to reduce nitrogen oxides by reduction components which mainly contain hydrogen can be used as NOx purifying catalysts. Not only the above NOx trap-catalysts but also an NOx selective reduction catalyst can be used, which contains Cu, Co, Ni, Fe, Ga, La, Ce, Zn, Ti, Ca, Ba or Ag and a mixture thereof and, Pt, Ir or Rh and a mixture thereof. However, in the exhaust gas purifying system of the present invention, since hydrogen can be highly efficiently used as a reduction component, the use of the NOx trap-catalyst is preferable.

Additionally, in the exhaust gas purifying system shown in FIG. 1, a structure for housing the hydrogen-catalyst 7 and the NOx trap-catalyst 8 in different catalyst containers is adopted as an example. However, it is possible to house these catalysts in the same container in the positions of the upstream and downstream sides thereof. Furthermore, it is possible to separately apply the catalysts of component compositions in the positions of the upstream and downstream sides of the same monolithic carrier.

Next, description will be made of a controlling method for transmitting or generating hydrogen by selectively reducing CO in order to highly efficiently purify NOx even in a low temperature region in the system combining the hydrogen-catalyst 7 and the NOx trap-catalyst 8.

For the air/fuel ratio (A/F)r during enrichment and for the time of enrichment (tr), control is mainly executed to the amount of fuel injection, the time of fuel injection, or a fuel injection timing, an ignition time, an opening/closing timing of an intake/exhaust valve or an optional combination thereof by combustion control means. Specifically, a Z value representing a theoretical mixture ratio of an oxidant and a reducer is controlled. That is, the atmosphere is adjusted to be an atmosphere where a Z value of exhaust gas flowing into the hydrogen-catalyst 7 is intermittently 1.0 or lower, i.e., an atmosphere where a reduction component such as hydrocarbon is excessive (rich side atmosphere), defined in the following equation:

$$Z = ([O_2] \times 2 + [NO])/([H_2] \times 2 + [CO] + [HC] \times \alpha)$$

Here, $[O_2]$, $[NO]$, $[H_2]$, $[CO]$ and $[HC]$ respectively denote concentrations of oxygen, nitric monoxide, hydrogen, carbon monoxide, and hydrocarbon, and $\alpha$ denotes a coefficient decided by a type of an HC component.

Then, when the NOx trap-catalyst 8 purifies NOx, concentration of hydrogen $[H_2]$ and concentration of all the reduction components [TR] in the exhaust gas are controlled by the hydrogen-catalyst 7 to satisfy relations represented by the following equations (1) and (2):

$$[H_2/TR]d > [H_2/TR]u \quad (1)$$

$$[H_2/Tr]d \geq 0.3 \quad (2)$$

Here, in the above equations, $[H_2/TR]u$ denotes a ratio of concentration of hydrogen $[H_2]u$ to concentration of all the reduction components [TR]u before the execution of enrichment or on the upstream side. $[H_2/TR]d$ denotes a ratio of concentration of hydrogen $[H_2]d$ to concentration of all the reduction components [TR]d at the inlet of the NOx trap-catalyst 8.

In addition to the control defined by the gas compositions of the above-mentioned equations (1) and (2), in the ratio $[H_2/TR]d$ of the concentration of hydrogen to the concentration of all the reduction components at the inlet of the NOx trap-catalyst during NOx discharging/purifying, a ratio of the concentration of hydrogen $[H_2]d$ to concentration of carbon monoxide $[CO]d$ in all the reduction components [TR]d is controlled to be $[H_2/CO]d > 1$. Thus, effects of other reduction components, particularly CO, impeding reaction between hydrogen and NOx, can be reduced to considerably increase reactivity between the hydrogen with a high reduction force and the NOx, and NOx purification efficiency can be further improved.

Next, description will be made of conditions for setting an air/fuel ratio (A/F)r during enrichment and the time of enrichment (tr).

As described above, the hydrogen-catalyst 7 is installed on the upstream side of the NOx trap-catalyst 8, and CO or HC is greatly reduced by the hydrogen-catalyst 7 to increase concentration of hydrogen, whereby NOx purification performance can be dramatically improved even in the low temperature region. However, the reduced exhaust gas flow rate also brings about a reduction in the NOx purification efficiency. This is attributed to the fact that under the condition of the low gas flow rate or flow velocity, not only CO but also hydrogen is reduced by the hydrogen-catalyst 7.

If the air/fuel ratio (A/F)r during enrichment and the time of enrichment (tr) are fixed, the amounts of CO and hydrogen supplied to the hydrogen-catalyst 7 are reduced more as the gas flow rate or flow velocity is lowered. On the other hand, since the volume of the hydrogen-catalyst 7 is not changed with respect to the gas flow rate and flow velocity, reactivity between CO and hydrogen generated by enrichment and the hydrogen-catalyst is increased more as the gas flow rate is lowered. As a result, not only the CO but also the hydrogen is reduced, and thus, the NOx purification efficiency in the low temperature region is lowered.

As described above, the mechanism of the hydrogen-catalyst is constituted of one or an optional combination of (a) the reaction for selectively removing CO by oxidation, and suppressing (transmitting) the consumption of hydrogen; (b) the reaction for adsorbing CO to transmit hydrogen; and (c) the reaction for reacting CO with $H_2O$ to generate hydrogen.

In the reaction (a), the CO is selectively adsorbed by precious metal, and then reacted with a surface oxygen or storage oxygen of $CeO_2$ present in the vicinity to be removed by oxidation, and thereby reduced. As the gas flow rate is lowered, the amount of CO supplied to the hydrogen-catalyst 7 is reduced while reactivity between the CO and the oxygen on a surface or the storage oxygen is increased. If the amount of CO is larger than that of the surface oxygen or the storage oxygen, the CO is effectively reduced. However, if the amount of CO is smaller than that of the surface oxygen or the storage oxygen, the hydrogen is also reduced in addition to the CO. Accordingly, in order to suppress the reduction of the hydrogen, the amounts of CO and hydrogen are increased. In other words, it is necessary to increase the amounts of CO and hydrogen in the combustion gas (exhaust gas) by lowering the air/fuel ratio (A/F)r during enrichment, and by prolonging the time of enrichment (tr).

Additionally, in the reaction (b), CO is adsorbed on the metal and the metal oxide. As the gas flow rate is lowered, the amount of CO supplied to the hydrogen-catalyst is reduced while the amount of CO adsorbed on the metal and the metal oxide is increased. If the amount of adsorbed CO is larger than that of the metal or the metal oxide on which the CO is adsorbed, the CO is effectively reduced. However, if the amount of adsorbed CO is smaller than that of the metal or the metal oxide on which the CO is adsorbed, the hydrogen is also adsorbed in addition to the CO. Accordingly, in order to suppress the reduction of the hydrogen, the amounts of CO and hydrogen are increased. In other words, similarly to the above-mentioned case, it is necessary to lower the air/fuel ratio (A/F)r during enrichment, and to prolong the time of enrichment (tr).

That is, in the exhaust gas purifying system according to the embodiment of the present invention, even if the exhaust gas flow rate (SV) is lowered, the air/fuel ratio (A/F)r during enrichment and the time of enrichment (tr) are controlled to satisfy conditions where the generated hydrogen is not oxidized before it reaches the NOx purifying catalyst of the downstream side.

The control of the above-mentioned enrichment conditions is executed specifically by a control circuit equipped in the control unit 11 or by a CPU equipped in the control unit 11 and operated by programs.

Figure 2:
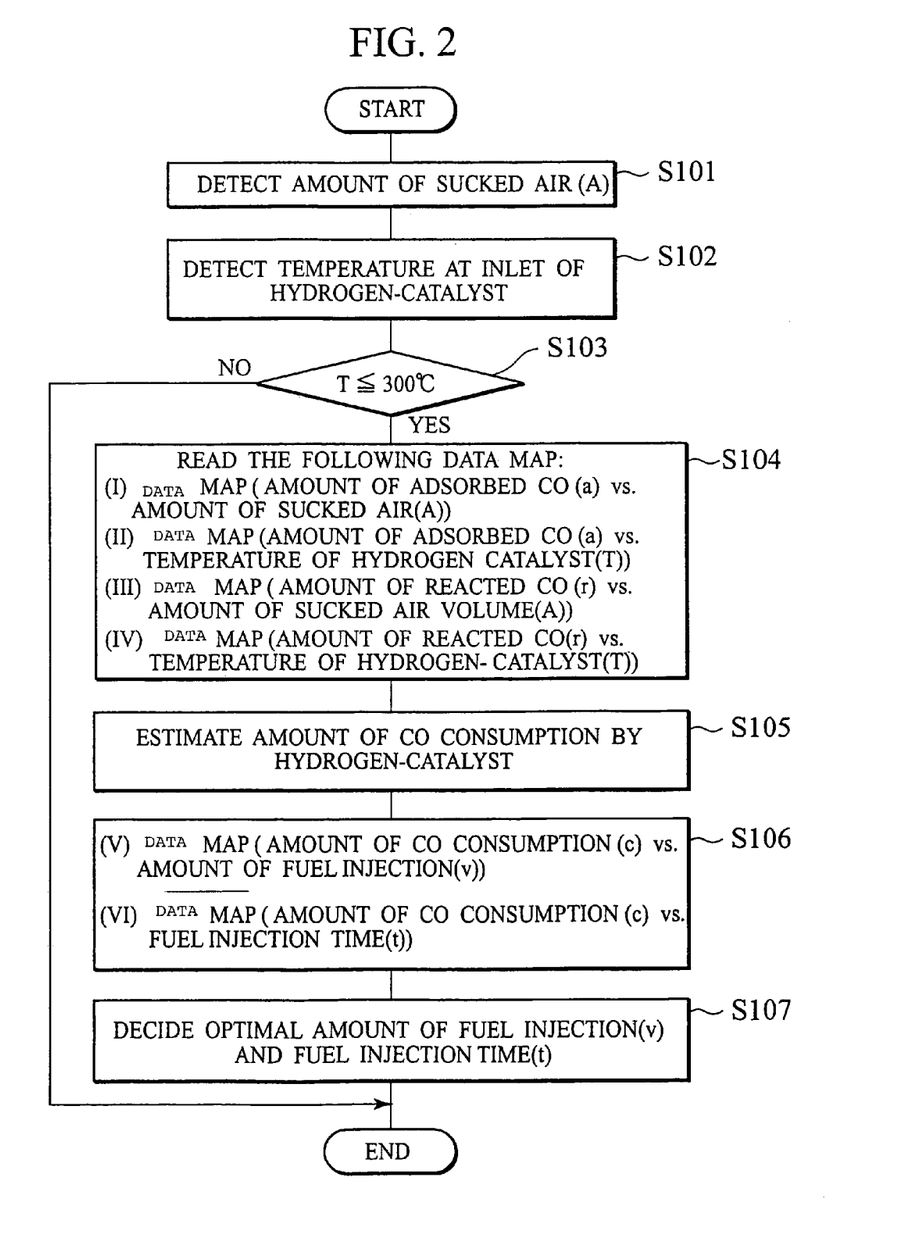
FIG. 2 is a flowchart showing a control process for the exhaust gas purifying system according to the embodiment of the present invention.

FIG. 2 is a flowchart showing a controlling method of enrichment conditions executed by such a control unit 11. That is, first, in step 101, the amount of air sucked into the internal combustion engine 1 is measured by the air flowmeter 6, and the measured value is detected by the control unit 11. An exhaust gas flow rate is decided from a value of the amount of sucked air and a value of the amount of fuel injection.

Then, in step 102, a temperature at the inlet of the hydrogen-catalyst 7 is measured by the thermo-sensor 9, and the measured value is detected by the control unit. As a temperature of the hydrogen-catalyst 7 is decided by an exhaust gas temperature, the detected value is equivalent to the temperature (T) of the hydrogen-catalyst 7. Steps 101 and 102 may be reversed in order, or simultaneous. In step 103, determination is made as to whether the temperature T is equal to or less than 300° C. or not. If the temperature T is equal to or less than 300° C., the control according to the embodiment is executed. If the temperature T exceeds 300° C., it is not necessary to add the control of the embodiment, and a conventional controlling method can be used.

Figure 3:
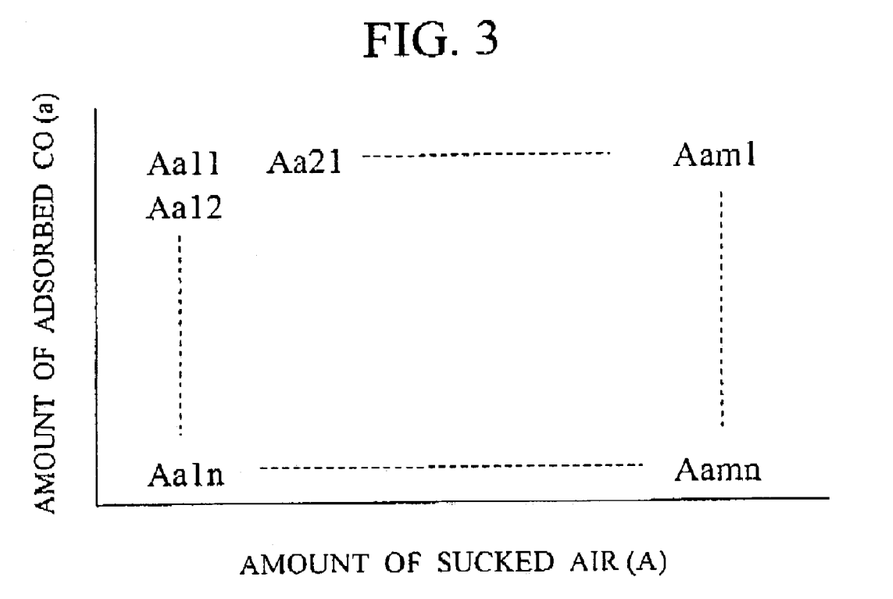
FIG. 3 is a data table conceptually showing a data map indicating correlation data between the amount of intake air to an internal combustion engine and the amount of CO adsorbed in a hydrogen-catalyst.
Figure 4:
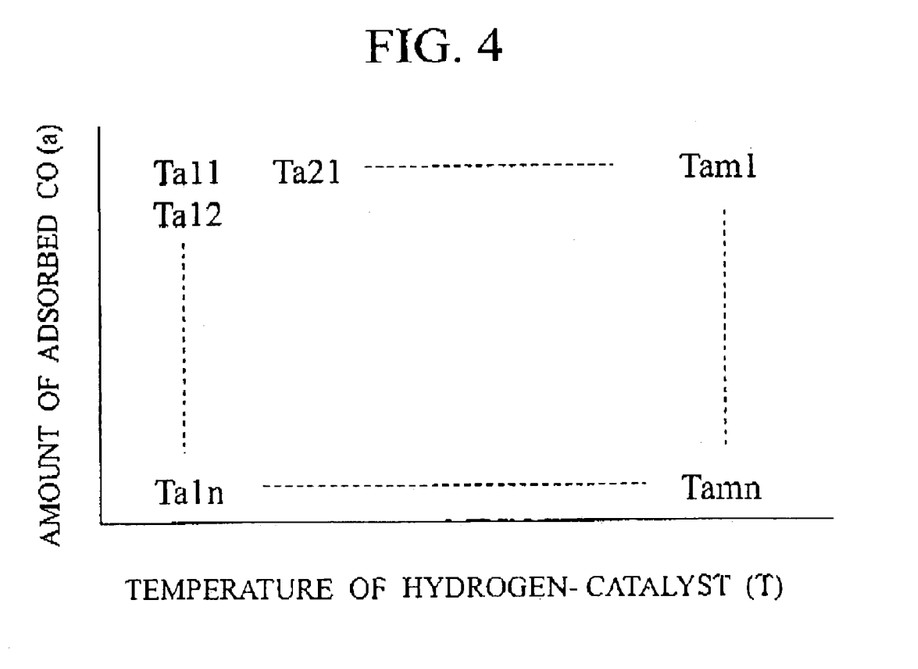
FIG. 4 is a data table conceptually showing a data map indicating correlation data between the temperature of the hydrogen-catalyst and the amount of CO adsorbed in the hydrogen-catalyst.
Figure 5:
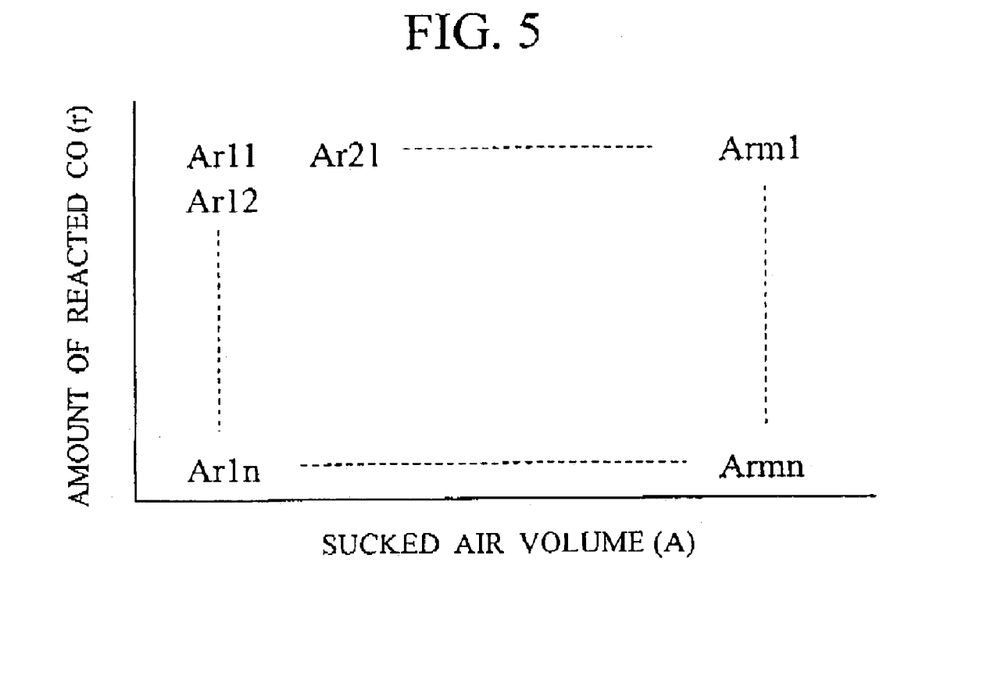
FIG. 5 is a data map example showing correlation data between the amount of intake air to the internal combustion engine and the amount of reacted CO in the hydrogen-catalyst.
Figure 6:
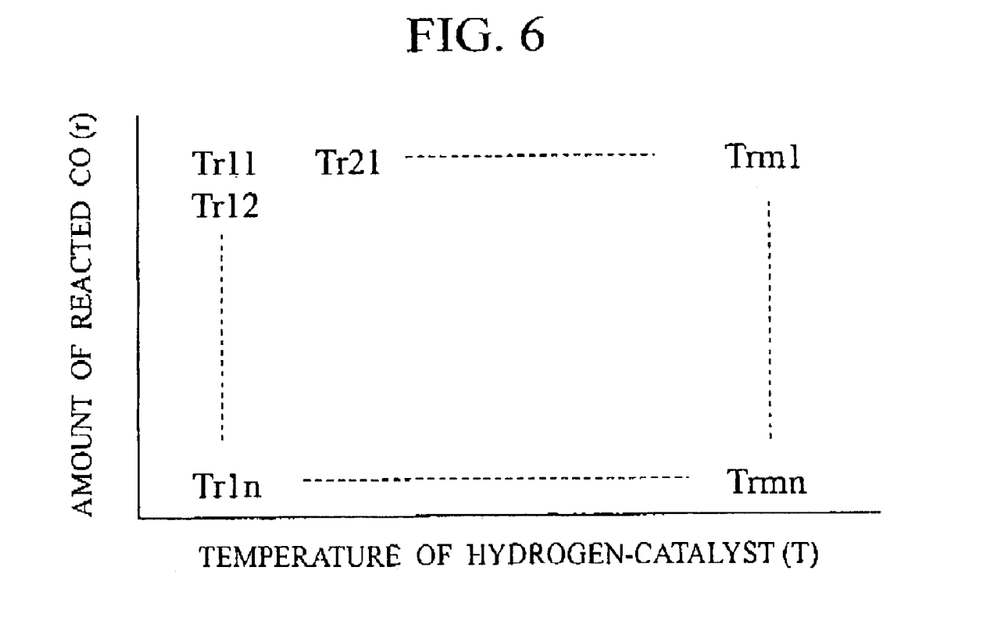
FIG. 6 is a data map example showing correlation data between the temperature of the hydrogen-catalyst and the amount of CO adsorbed in the hydrogen-catalyst.

In step 104, data maps prestored in the control unit 11 are read the following data map (i) to (iv):

(i) data map indicating the relation between the amount of sucked air (A) and the amount of CO (a) adsorbed by the hydrogen-catalyst shown in FIG. 3;

(ii) data map indicating the relation between a catalyst temperature (T) and the amount of CO (a) adsorbed by the hydrogen-catalyst shown in FIG. 4;

(iii) data map indicating the relation between the amount of sucked air (A) and the amount of CO (r) reacted by the hydrogen-catalyst shown in FIG. 5; and (iv) data map indicating the relation between the catalyst temperature (T) and the amount of CO (r) reacted by the hydrogen-catalyst shown in FIG. 6.

In step 105, from the read data maps, the corresponding amounts of reacted CO and adsorbed CO are read based on the detected amount of sucked air (A) and the detected catalyst temperature (T), and the amount of CO consumption is estimated based on the read amounts of reacted CO and adsorbed CO. The estimated amount of CO consumption is represented by a sum of, e.g., the amounts of reacted CO and adsorbed CO.

Figure 7:
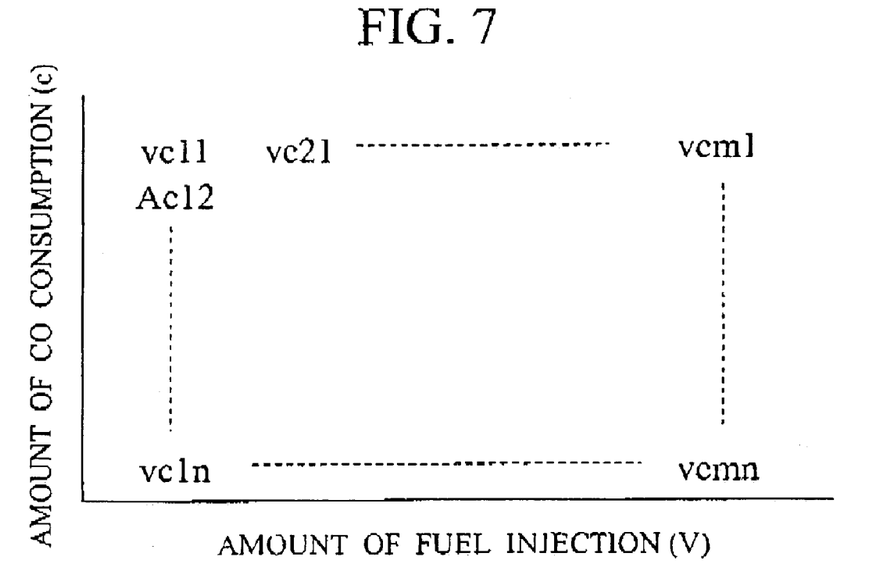
FIG. 7 is a data map example of an optimal amount of fuel injection with respect to the amount of CO consumption in the hydrogen-catalyst.
Figure 8:
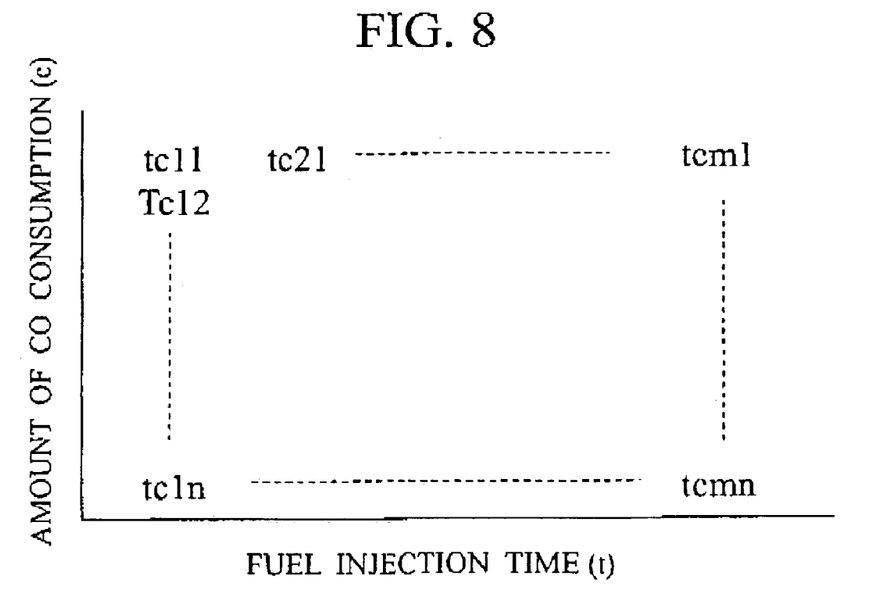
FIG. 8 is a data map example of the amount of fuel injection with respect to the amount of CO consumption in the hydrogen-catalyst.

Then, in step 106, data maps prestored in the control unit 11 are read: (v) data map indicating the relation between the amount of CO consumption(c) and the corresponding optimal amount of fuel injection (v) shown in FIG. 7, and (vi) data map indicating the relation between the amount of CO consumption (c) and the optimal time of fuel injection (t) shown in FIG. 8.

Subsequently, in step 107, the optimal amount of fuel injection and the optimal time of fuel injection are decided with respect to the amount of CO consumption estimated from the data maps read in the previous step. By control of the amount of fuel injection, control of an air/fuel ratio (A/F)r during enrichment is executed. By control of the time of fuel injection, control of the time of enrichment (tr) is executed. Incidentally, the air/fuel ratio (A/F)r during enrichment and the time of enrichment (tr) are preferably controlled to satisfy the following conditional equation (3) in a state where an exhaust gas flow rate is equal to or less than a space velocity of 28000 h$^{-1}$ in the catalyst:

$$0.18 \text{ (sec)} < \text{Ir} \quad (3)$$

Here, $\text{Ir} = \text{tr} \times 1/(A/F)r$

In the case of satisfying the equation (3), passing through the hydrogen-catalyst enables the amount of hydrogen in the exhaust gas to be maintained or increased. Accordingly, even if the exhaust gas flow rate is low, the amount of hydrogen necessary for NOx purification can be constantly supplied from the hydrogen-catalyst 7 to the NOx purifying catalyst 8, whereby high NOx purification efficiency can be obtained.

More preferably, control is executed to satisfy the following conditional equation (4):

$$0.18 \text{ (sec)} < \text{Ir} < 0.4 \quad (4)$$

In the case of satisfying the equation (4), passing through the hydrogen-catalyst enables an increase of the amount of hydrogen in the exhaust gas, and a sure reduction in the amount of CO, whereby a ratio of hydrogen in the exhaust gas can be greatly increased. Thus, it is possible to obtain higher NOx purification efficiency even if the exhaust gas flow rate is lowered.

EXAMPLES

Next, specific description will be mode of the exhaust gas purifying systems of examples of the present invention and a comparative example.

<Exhaust Gas Purifying System>

The systems of the examples and the comparative example are the system shown in FIG. 1, where a catalyst containing $CeO_2$, alumina and Pt, having an oxygen storage effect and a CO adsorbing ability, was used as a hydrogen-catalyst. As an NOx catalyst, an NOx trap-catalyst containing Pt, Rh, alumina, and an NOx adsorbent, i.e., Ba, was used. The hydrogen-catalyst and the NOx catalyst were respectively produced by the following methods.

1) Manufacturing Method of Hydrogen-catalyst:

A cerium oxide was impregnated with dinitrodiamino platinum nitrate aqueous solution, dried, and then calcined at 400° C. for 1 hour to obtain $Pt/CeO_2$ powder. This powder, γ-alumina, and alumina sol were thrown into a ball mill at a weight ratio of 100:40:10, mixed with water in the ball mill, and crushed to obtain slurry. The slurry was stuck to a monolithic carrier base material of 2 mils and 900 cells (139.5 cells/cm$^2$, wall thickness of 0.0051 cm), and calcined at 400° C. for about 1 hour. Thus, the amount of carried Pt was 2.12 g/L (honeycomb volume). A content of $CeO_2$ was 105 g/L.

2) Manufacturing Method of NOx Catalyst:

Active alumina was impregnated with dinitrodianmin Pt solution, dried, and then calcined in air at 400° C. for 1 hour to obtain Pt carrying alumina powder (powder A). Pt concentration of the powder was 3.0%. Then, active alumina powder was impregnated with nitrate Rh aqueous solution, dried, and than calcined in air at 400° C. for 1 hour to obtain Rh carried alumina powder (powder B). Rh concentration of the powder was 2.0%.

The powder A of 576 g, the powder B of 86 g, the active alumina powder of 238 g, and water of 900 g were put into a magnetic ball mill, mixed, and crushed to obtain slurry. The slurry was coated to a cordierite monolithic substrate (volume: 1.7 L) of 400 cells (62 cells/cm$^2$), dried at 130° C. after excess slurry in the cells was removed by an air flow, and then calcined at 400° C. for 1 hour to obtain a catalyst having coating layer of 200 g/L. This catalyst was impregnated with Ba aqueous solution, dried, and then calcined at 400° C. in air for 1 hour to obtain a catalyst having coating layer of 250 g/L.

<Controlling Method of Exhaust Gas Purifying System>

Comparative Example

In the exhaust gas purifying system of the comparative example for intermittently setting an air/fuel ratio from a lean state to a rich state, under the same conditions for enrichment, an operation of purifying exhaust gas was carried out irrespective of changes in an exhaust gas flow rate.

Between the case of a fast exhaust gas flow velocity (flow rate), i.e., the case of a transmitted gas flow rate SV=45000 h$^{-1}$ in the hydrogen-catalyst 7, and the case of a slow gas flow rate SV, i.e., the case of SV=28000 h$^{-1}$, comparison was made regarding an exhaust gas component flowing into the hydrogen-catalyst and an exhaust gas component flowing out of the hydrogen-catalyst. Conditions for enrichment in the comparative example are as follows:

Air/fuel ratio during enrichment: (A/F)r=11,

Time of enrichment: (tr)=2[sec],

Ir(t·F/A)=0.18

Figure 9:
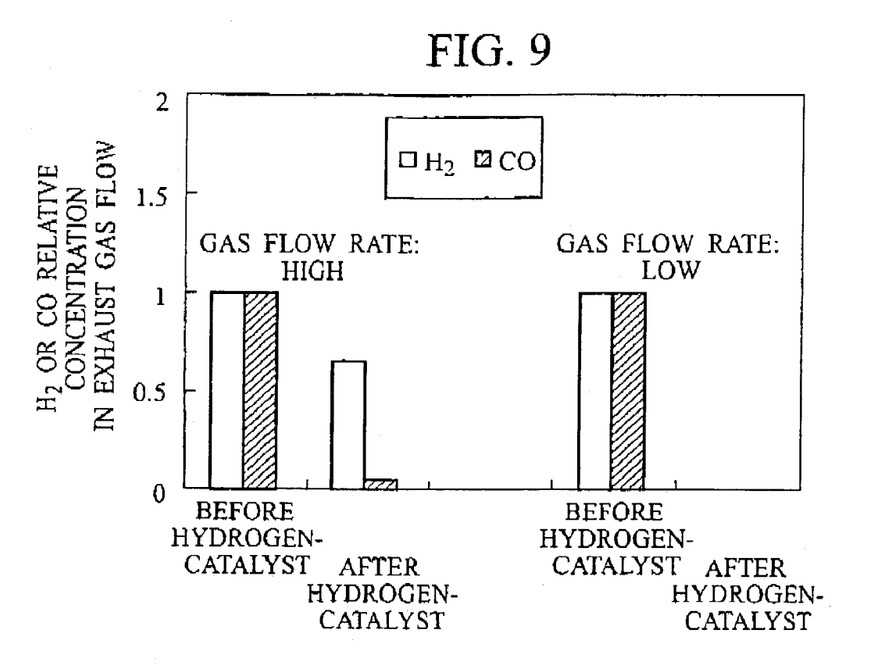
FIG. 9 is a graph showing relative values of hydrogen and CO contents in exhaust gas before and after the passage through the hydrogen-catalyst in comparison between the cases of high and low gas flow velocities in an exhaust gas purifying system of a comparative example 1 of the present invention.

A result is shown in a graph of FIG. 9. In the drawing, concentrations of hydrogen and CO in the exhaust gas after passage through the hydrogen-catalyst 7 are shown to be values relative to concentrations of hydrogen and CO before passage through the hydrogen-catalyst.

As apparent from the graph of FIG. 9, in the case of a fast gas flow velocity, CO is greatly reduced with respect to the hydrogen. On the other hand, in the case of a slow gas flow velocity, concentrations of CO and hydrogen are both zero, indicating that not only the CO but also the hydrogen is reduced.

Examples 1 to 3

In the exhaust gas purifying system of each of the examples 1 to 3 for intermittently setting an air/fuel ratio from a lean state to a rich state, conditions for enrichment in the case of a small exhaust gas flow rate (SV=28000 h$^{-1}$) were adjusted as follows:

Example 1:
Air/fuel ratio during enrichment: (A/F)r=11,
Time of enrichment: (tr)=4[sec],
Ir(t·F/A)=0.36[sec]

Example 2:
Air/fuel ratio during enrichment: (A/F)r=10,
Time of enrichment: (tr)=2[sec],
Ir(t·F/A)=0.2[sec]

Example 3:
Air/fuel ratio during enrichment: (A/F)r=10,
Time of enrichment: (tr)=4[sec],
Ir(t·F/A)=0.4[sec]

Figure 10:
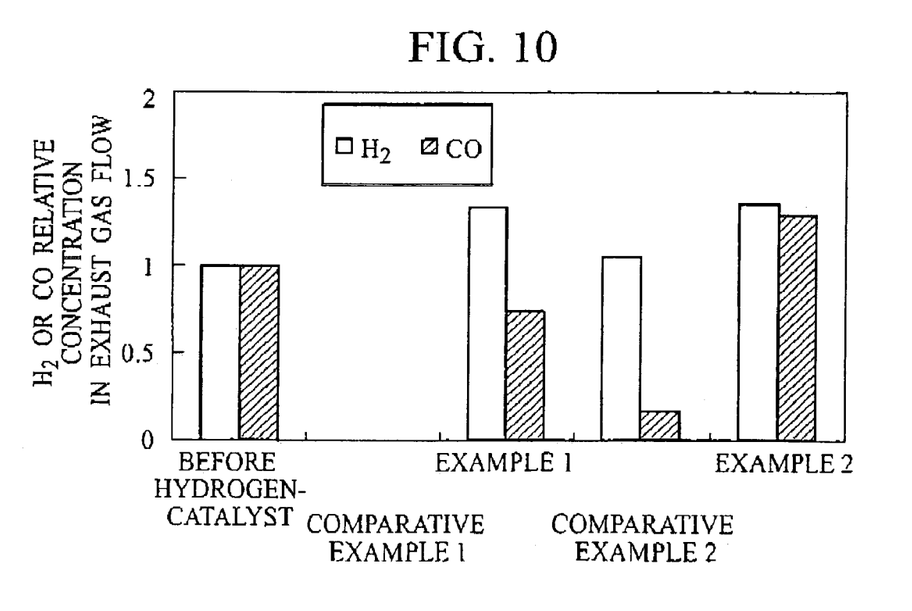
FIG. 10 is a graph showing relative values of hydrogen and CO contents in exhaust gas after the passage through the hydrogen-catalyst in the case of a low gas flow velocity in exhaust gas purifying systems of the comparative example 1 and 2, and examples 1 and 2 of the present invention.

Result, are shown in FIG. 10. FIG. 10 shows exhaust gas components after flowing out of the hydrogen-catalyst in the case of a slow gas flow velocity (SV=28000 h$^{-1}$). Additionally, data of exhaust gas components before flowing into the hydrogen-catalyst and data of the comparative example are shown in the graph of FIG. 10. Values of the respective components are shown to be values relative to concentrations of hydrogen and CO before passage through the hydrogen-catalyst.

As apparent from FIG. 10, different from the comparative example, in the example 1 of the longer time of enrichment (tr), there was sufficient hydrogen, verifying that CO was reduced more compared with hydrogen. Different from the comparative example, in the example 2 of the smaller air/fuel ratio (A/F)r during enrichment, there was also sufficient hydrogen, verifying that CO was greatly reduced compared with hydrogen. Furthermore, different from the comparative example, in the example 3 of the smaller air/fuel ratio (A/F)r during enrichment and the longer time of enrichment (tr), there was sufficient hydrogen. However, CO was not reduced so greatly. The insufficient reduction of CO may be attributed to the fact that the amount of CO generated by enrichment was larger than the amount of surface oxygen or the amount of storage oxygen, present in the hydrogen-catalyst 7, or the amount of adsorbed CO.

Additionally, table 1 shows NOx purification efficiency of an NOx purifying catalyst 8 installed on the downstream side of the hydrogen-catalyst 7 in each of the examples and the comparative example where the air/fuel ratio (A/F)r during enrichment and the time of enrichment (tr) are variously adjusted. It was verified that after passage through the hydrogen-catalyst 7, i.e., in the case of a high hydrogen ratio at the inlet of the NOx purifying catalyst 8, the nitrogen oxides were purified highly efficiently.

TABLE 1

| | Conditions for enrichment | | | NOx purification rate (%) |
|---|---|---|---|---|
| | (A/F)r | tr(sec) | Ir | |
| Embodiment 1 | 11 | 4 | 0.36 | 94 |
| Embodiment 2 | 10 | 2 | 0.2 | 96 |
| Embodiment 3 | 10 | 4 | 0.4 | 93 |
| Comparative example | 11 | 2 | 0.18 | 33 |

As described above, the exhaust gas purifying system of the present invention is mainly constituted by having the hydrogen-catalyst, the NOx purifying catalyst disposed on the downstream side of the exhaust passage thereof, and the catalyst control unit, and the catalyst control unit executes control to increase an enrichment depth and/or the time of enrichment as the exhaust gas flow rate is lowered. Therefore, the present invention is greatly advantageous in that even if the exhaust gas flow rate (SV) is lowered, it is possible to constantly supply the amount of hydrogen necessary for NOx purification to the NOx purifying catalyst at the succeeding stage and, even if fluctuation occurs in the exhaust gas flow rate, it is possible to efficiently purify the nitrogen oxides even in the low temperature region without being influenced by the fluctuation.

The entire contents of Japanese Patent Applications P2002-040950 (filed on Feb. 19, 2002) and P2003-27970 (filed on Feb. 5, 2003) are incorporated herein by reference. Although the inventions have been described above by reference to certain embodiments of the inventions, the inventions are not limited to the embodiments described above. Modifications and variations of the embodiments described above will occur to those skilled in the art, in light of the above teachings. The scope of the inventions is defined with reference to the following claims.

What is claimed is:

1. A controlling method for an exhaust gas purifying system having an internal combustion engine, an exhaust passage of exhaust gas from the internal combustion engine, a hydrogen-catalyst provided in the exhaust passage to make at least a reaction for selectively removing CO by oxidation, and suppressing consumption of hydrogen, or a reaction for adsorbing CO, and transmitting hydrogen, the hydrogen-catalyst containing at least $CeO_2$ and precious metal, and an NOx purifying catalyst provided on a downstream of the hydrogen-catalyst of the exhaust passage to reduce nitrogen oxides, comprising the steps of:

(a) detecting the amount of air sucked into the internal combustion engine which operates under lean conditions and intermittent rich conditions;

(b) detecting a temperature of exhaust gas flowing into the hydrogen-catalyst;

(c) reading prestored first to fourth data maps, the first data map indicating a relation between the amount of sucked air and the amount of adsorbed CO in the hydrogen-catalyst, the second data map indicating a relation between the exhaust gas temperature and the amount of adsorbed CO in the hydrogen-catalyst, the third data map indicating a relation between the amount of sucked air and the amount of reacted CO in the hydrogen-catalyst, and the fourth data map indicating a relation between the exhaust gas temperature and the amount of reacted CO in the hydrogen-catalyst;

(d) reading the amount of adsorbed CO and the amount of reacted CO in the hydrogen-catalyst based on the detected amount of sucked air and the detected exhaust gas temperature by referring to the first to fourth data maps, and predicting the amount of CO consumption in the hydrogen-catalyst from the amount of adsorbed CO and the amount of reacted CO;

(e) reading prestored fifth and sixth data maps, the fifth data map indicating a relation between the amount of CO consumption and an optimal amount of fuel injection with respect to the amount of CO consumption, and the sixth data map indicating the amount of CO consumption and an optimal time of fuel injection with respect to the amount of CO consumption;

(f) deciding the optimal amount of fuel injection and an optimal time of fuel injection condition based on the predicted amount of CO consumption by referring to the fifth and sixth data maps; and (g) controlling an air/fuel ratio of mixed gas of fuel and air supplied to the internal combustion engine, which executes enrichment condition control for reducing an air/fuel ratio (A/F)r during enrichment to prolong a time of enrichment (tr) as a flow rate of exhaust gas emitted from the internal combustion engine is lowered in intermittent enrichment of the air/fuel ratio.

2. The controlling method according to claim 1, wherein an air/fuel ratio (A/F)r and a time of enrichment (tr) decided by the optimal amount of fuel injection and the optimal time of fuel injection satisfy the following condition of equation (1) in a state where an exhaust gas flow rate obtained from the amount of the sucked air is equal to or less than 28000 $h^{-1}$ of a space velocity in the catalyst:

$$0.18 \ (sec) < Ir \quad (1)$$

where, $Ir = tr \times 1/(A/F)r$, (A/F)r: air/fuel ratio (A/F) during enrichment, and tr: time of enrichment (sec).

3. The controlling method according to claim 1, wherein the steps (c) to (f) are executed only when a temperature of the hydrogen-catalyst is equal to or less than 300° C. after the detection of the temperature of the exhaust gas flowing into the hydrogen-catalyst.

4. An exhaust gas purifying system, comprising:

an internal combustion engine which operates under lean conditions and intermittent rich conditions;

an exhaust passage of exhaust gas from the internal combustion engine;

a hydrogen-catalyst provided in the exhaust passage to make at least a reaction for selectively removing CO by oxidation, and suppressing consumption of hydrogen, or a reaction for adsorbing CO, and transmitting hydrogen;

an NOx purifying catalyst provided on a downstream of the hydrogen-catalyst of the exhaust passage to reduce nitrogen oxides; and a control unit controlling an air/fuel ratio of mixed gas of fuel and air supplied to the internal combustion engine, which executes enrichment condition control for reducing an air/fuel ratio (A/F)r during enrichment to prolong a time of enrichment (tr) as a flow rate of exhaust gas emitted from the internal combustion engine is lowered in intermittent enrichment of the air/fuel ratio.

5. The exhaust gas purifying system according to claim 4, wherein the hydrogen-catalyst removes carbon monoxide and hydrocarbon by oxidation in a lean state of an air/fuel ratio, selectively removes carbon monoxide in a rich state, and generates or transmits hydrogen.

6. The exhaust gas purifying system according to claim 4, wherein the air/fuel ratio (A/F)r during enrichment and the time of enrichment (tr) satisfy the condition of a following equation in a state where the exhaust gas flow rate is equal to or less than 28000 $h^{-1}$ of a space velocity in the catalyst:

$$0.18 \ (sec) < Ir$$

where, $Ir = tr \times 1/(A/F)r$, (A/F)r: air/fuel ratio (A/F) during enrichment, and tr: time of enrichment (see).

7. The exhaust gas purifying system according to claim 4, wherein the control unit executes the enrichment condition control in enrichment when a temperature of the hydrogen-catalyst is equal to or less than 300° C.

8. The exhaust gas purifying system according to claim 4, further comprising, a flow-meter measuring an amount of air sucked into the internal combustion engine, a valve adjusting an amount of fuel injected into the internal combustion engine, and a temperature sensor measuring a temperature of exhaust gas flowing into the hydrogen-catalyst, wherein the control unit is provided with a program for executing the following process:

a) detecting the amount of air sucked into the internal combustion engine by the flowmeter;

b) detecting the temperature of exhaust gas flowing into the hydrogen-catalyst by the temperature sensor;

c) predicting the amount of CO consumption in the hydrogen-catalyst based on the detected amount of sucked air and the detected exhaust gas temperature; and d) setting an air/fuel ratio (A/F)r during enrichment and a time of enrichment (tr) in accordance with the predicted amount of CO consumption.

9. The exhaust gas purifying system according to claim 4, wherein the NOx purifying catalyst traps NOx when the air/fuel ratio is at a lean side, and reduces NOx when the air/fuel ratio is at a rich side.

10. The exhaust gas purifying system according to claim 4, wherein the hydrogen-catalyst contains ceria, and precious metal of at least one or more selected from the group consisting of Pt, Pd and Rh.

11. The exhaust gas purifying system according to claim 4, wherein the hydrogen-catalyst contains ceria, alumina, and precious metal of at least one or more selected from the group consisting of Pt, Pd and Rh.

12. The exhaust gas purifying system according to claim 4, wherein the NOx purifying catalyst contains alkaline metal or alkaline earth metal, and precious metal of at least one or more selected from the group consisting of Pt, Pd and Rh.

13. An exhaust gas purifying system, comprising:

an internal combustion engine which operates under lean conditions and intermittent rich conditions;

an exhaust passage of exhaust gas from the internal combustion engine;

a hydrogen-catalyst provided in the exhaust passage to make at least a reaction for selectively removing CO by oxidation, and suppressing consumption of hydrogen, or a reaction for adsorbing CO, and transmitting hydrogen, the hydrogen-catalyst containing ceria and precious metal of at least one or more selected from the group consisting of Pr, Pd and Rh;

an NOx purifying catalyst provided on a downstream of the hydrogen-catalyst of the exhaust passage, the NOx purifying catalyst containing alkaline metal or alkaline earth metal, and precious metal of at least one or more selected from the group consisting of Pr, Pd and Rh; and a control unit for controlling an air/fuel ratio of mixed gas of fuel and air supplied to the internal combustion engine, which reduces an air/fuel ratio (A/F)r during enrichment to prolong a time of enrichment (tr) as a flow rate of exhaust gas emitted from the internal combustion engine is lowered.

14. The exhaust gas purifying system according to claim 13, wherein the hydrogen-catalyst further contains alumina.

15. The exhaust gas purifying system according to claim 13, wherein the air/fuel ratio (A/F)r during enrichment and the time of enrichment (tr) satisfy the condition of a following equation in a state where the exhaust gas flow rate is equal to or less than 28000 $h^{-1}$ of a space velocity in the catalyst:

$$0.18 \text{ (sec)} < Ir$$

where, $Ir = tr \times 1/(A/F)r$,
(A/F)r: air/fuel ratio (A/F) during enrichment, and
tr: time of enrichment (sec).

16. The exhaust gas purifying system according to claim 13, wherein the control unit executes the enrichment condition control in enrichment when a temperature of the hydrogen-catalyst is equal to or less than 300° C.

17. The exhaust gas purifying system according to claim 13, further comprising a flowmeter measuring an amount of air sucked into the internal combustion engine, a valve adjusting an amount of fuel injected into the internal combustion engine, and a temperature sensor measuring a temperature of exhaust gas flowing into the hydrogen-catalyst, wherein the control unit is provided with a program for executing the following process:

a) detecting the amount of air sucked into the internal combustion engine by the flowmeter;

b) detecting the temperature of exhaust gas flowing into the hydrogen-catalyst by the temperature sensor;

c) predicting the amount of CO consumption in the hydrogen-catalyst based on the detected amount of sucked air and the detected exhaust gas temperature; and d) setting the air/fuel ratio (A/F)r during enrichment and a time of enrichment (tr) in accordance with the predicted amount of CO consumption.

* * * * *